(12) United States Patent
Kawai

(10) Patent No.: US 8,045,220 B2
(45) Date of Patent: Oct. 25, 2011

(54) METHOD OF CREATING COLOR CONVERSION TABLE AND IMAGE PROCESSING APPARATUS

(75) Inventor: Yoshinori Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 798 days.

(21) Appl. No.: 11/195,670

(22) Filed: Aug. 3, 2005

(65) Prior Publication Data

US 2006/0028665 A1 Feb. 9, 2006

(30) Foreign Application Priority Data

Aug. 5, 2004 (JP) ................................. 2004-229357

(51) Int. Cl.
*G06F 15/00* (2006.01)
(52) U.S. Cl. ........ 358/1.9; 358/3.23; 358/518; 358/523; 358/525; 358/520; 358/521; 358/522; 345/589; 345/591; 345/593; 345/600; 345/601; 345/602; 345/603; 345/604; 345/549; 382/162; 382/167
(58) Field of Classification Search .................. 358/1.9, 358/3.23, 518–523, 525; 345/589, 591, 593, 345/600–604, 549; 382/162, 167
See application file for complete search history.

(56) References Cited

U.S. PATENT DOCUMENTS

| | | | | |
|---|---|---|---|---|
| 5,428,465 A | * | 6/1995 | Kanamori et al. | 358/518 |
| 6,068,361 A | * | 5/2000 | Mantell | 358/3.03 |
| 7,193,746 B2 | * | 3/2007 | Kanai | 358/1.9 |
| 2002/0031258 A1 | * | 3/2002 | Namikata | 382/165 |
| 2002/0154326 A1 | * | 10/2002 | Tsuchiya et al. | 358/1.9 |
| 2003/0021470 A1 | * | 1/2003 | Kakutani | 382/162 |
| 2003/0103222 A1 | * | 6/2003 | Kato et al. | 358/1.9 |
| 2005/0030559 A1 | * | 2/2005 | Jacob | 358/1.9 |
| 2005/0094169 A1 | * | 5/2005 | Berns et al. | 358/1.9 |

FOREIGN PATENT DOCUMENTS

| | | |
|---|---|---|
| JP | 3371964 | 11/2002 |
| JP | 2004-221635 | 8/2004 |

OTHER PUBLICATIONS

K. D. Gennetten, "RGB to CMYK conversion using 3D barycentric interpolation", Proc. SPIE 1909, (1993), pp. 116-126.*
Office Action dated Jun. 4, 2010 in JP 2004-229357.

* cited by examiner

*Primary Examiner* — Twyler Haskins
*Assistant Examiner* — Michael Burleson
(74) *Attorney, Agent, or Firm* — Fitzpatrick, Cella, Harper & Scinto

(57) ABSTRACT

In creating a color conversion table, search time for searching a point at which a color difference with a target color corresponding to a grid point is minimum can be reduced effectively. In a predetermined grid point constituting a second pre-color processing table, a post-RGB value of a target color of the grid point is determined by interpolation computation using a first pre-color processing table created beforehand. An interpolation operation using each grid point data of a plurality of grid points in the neighborhood in the table is executed, thus the post-RGB value of an object grid point is determined. Next, a neighboring region of the obtained post-RGB value is set, and a post-RGB value of most approximate to the target color in the neighboring region is determined as grid point data of the object grid point.

7 Claims, 6 Drawing Sheets

METHOD OF CREATING COLOR CONVERSION TABLE AND IMAGE PROCESSING APPARATUS

BACKGROUND OF THE INVENTION

1. Field of the Invention

The present invention relates to a method for creating a color conversion table and an information processing apparatus, in particular, it relates to a method for creating a lookup table (hereinafter, referred to as a LUT simply) used in a color conversion process which generates data used in an image output apparatus such as a printer, and an image processing apparatus which executes a creating is process of the LUT.

2. Description of the Related Art

In image outputs by an inkjet printer or the like, generally a color conversion process is executed to convert image data of an input color signal from an image input device into image data of an output color signal used in the printer as an image output apparatus, to generate data for output. The input color signal is specified as a color of device color space (such as RGB color space) dependent on the image input device. On the other hand, the output signal is specified as a color of device color space (such as CMYK and RGB) dependent on the image output device. Therefore, the color conversion process is executed for converting the device color space of the input color signals into the color space of the output image signal. Conventionally, the color conversion from the device color space of an input device to the device color space of an output device has been realized by matrix operation. Currently, however, the color conversion often uses a three dimension LUT to acquire higher precise conversion.

The color conversion for color reproducibility (or reproducibility of a color gamut) is executed as one mode of the above-described color conversion. There are various types of color reproducibility such as color reproducibility with emphasis on tone, color reproducibility with emphasis on chroma, color reproducibility with emphasis on coincidence of colorimetry, and color reproducibility with emphasis on memory color. A prior art prepares a plurality of LUTs provided for a plurality of types of such color reproducibility, and selects an LUT according to the kind of image to be output to execute color conversion. Thus, color reproduction suitable for the image to be output can be realized. Also, in order to maintain this color reproducibility satisfactorily, the color conversion from the color space of an input device to the color space of an output device may be controlled by dividing the color conversion into two conversions, a pre-color conversion (color correction; gamut mapping) which executes the conversion of mapping of the color gamut and a post-color correction (color separation) which executes the color separation into data of printing agents such as ink.

Many kinds of color spaces are known as input color spaces generally used to specify image data, for example, sRGB and AdobeRGB for an RGB system and NTSC. To execute the color conversion from the device color space of the input device into the device color space of the output device correspondingly to a plurality of such input color space, at every combination of input and output devices an LUT specified for the color conversion between the combination must be provided. On the other hand, a color conversion system using an ICC profile which can execute color conversion regardless of the combination of input and output devices is also known. The ICC profile specifies the color conversion from input color space into device independent color space (for example, XYZ and Lab), correspondingly to the input device of the input color space; and likewise specifies the color conversion from the device independent color space into the device color space of the output device, correspondingly to the output device of the output color space. The color conversion which the profile specifies is concretely realized with LUTs just as described above. The color conversion using the ICC profile basically requires that each input and output device prepares just one profile specifying conversion relationship with device-independent color space. And, the color conversion of device color space between the input and output devices can be performed by combining the profiles of each input and output device. Additionally, the ICC profile holds an LUT having three properties, i.e., the color reproducibility with emphasis on tone, the color reproducibility with emphasis on chroma, and the color reproducibility with emphasis on coincidence of colorimetry, in one profile.

The LUT for the color conversion from the device color space of the input device into the device color space of the output device directly, and the LUT as the profile specifying color conversion relationship between the device independent color space and each device color space of the input and output devices are both created as follows.

First, target colors corresponding to grid points constituting the LUT to be created are determined. Next, device color of the output device (for example, post-RGB (RGB generated in the above-described pre-color conversion) or CYMK) which is most approximate to the target color is searched, and the device color is set as the color corresponding to the grid point, i.e., the grid point data. The target colors and the device colors based on the target colors are usually specified in a uniform color space (Lab or Luv).

More specifically, first, based on post-RGB (or CMYK) which is a color signal of the device color space of the printer, a predetermined number of color patches of these colors are printed out by the printer. Then, the color patches are measured to acquire the color signal of uniform-color color space corresponding to the color patches. Thus, the relationship between a post-RGB value (or a CMYK value) and a Lab value (or a Luv value or the like) of the uniform-color color space can be acquired. Additionally, when determining the relationship from the post-RGB value to the Lab value, although as the number of samples such as the color patches increases the precision becomes greater, it is unrealistic to print out all colors of the color space of the post-RGB as a sample. Thus, the color patches of colors of which the distance in the device color space of the printer is, for example, equidistant are printed out and measured to determine the relationship between the post-RGB values and the Lab values. Accordingly, a table from the printer-dependent color space to uniform color space (hereinafter, referred to as a color-space correspondence table) can be obtained. Additionally, for colors (post-RGB values) other than colors of post-RGB values which output the color patches, this color-space correspondence table is used to compute a known interpolation operation such as a tetrahedron interpolation to estimate Lab values, and thus similar relationships can be determined.

Next, a target color (a Lab value) corresponding to an object grid point constituting the LUT to be created and Lab values corresponding to all post-RGB values of the color-space correspondence table are compared to search the most approximate point which is a point at which the color difference is minimum. Thus, the post-RGB value of the most approximate point can be determined as a color corresponding to the object grid point, i.e., grid point data.

However, this method requires an enormous amount of time to search all post-RGB values. Japanese Patent No. 3371964 discloses a method to reduce the search time. In this document, first, a point at which a color difference with the target color is minimum is searched among post-RGB values corresponding to a measured color patch. Next, a point which can be approximated as a point at which the color difference with the target color is minimum is searched among post-RGB values in a neighboring region of the searched post-RGB value, and the post-RGB value is set as the color corresponding to the grid point. By reducing the search region, the search time is reduced.

However, even with the method in consideration of reducing the search time disclosed in Japanese Patent No. 3371964, the method still leaves room for reductions in search time, that is, the search time has not been reduced sufficiently. Although the method of Japanese Patent No. 3371964 searches a point at which the color difference with a target color is minimum among post-RGB values corresponding to the measured color patch in order to circumvent searching all post-RGB values, the method still executes a search, which requires a certain amount of time.

In addition, the neighboring region to be searched needs to contain midpoints between the grid point at which the color difference is minimum and adjacent grid points, and thus the neighboring region to be searched is determined by the number of grid points of the color-space correspondence table. The search time can be reduced by reducing the neighboring region. However, the neighboring region cannot be reduced alone. That is, in order to reduce the neighboring region, the number of grid points has to be increased. Thus, the reduction in the search time cannot be realized effectively.

SUMMARY OF THE INVENTION

An object of the present invention is to provide a method for creating a color conversion table and an image processing apparatus which can effectively reduce search time of points at which a color difference with a target color corresponding to a grid point is minimum.

In the first aspect of the present invention, there is provided a method of creating a color conversion table for converting an input color signal value into an output color signal value, the method comprising the steps of:
  a step for providing a first color conversion table for converting an input color signal value into an output color signal value and a color-space correspondence table for converting a color space which the output color signal value has into other predetermined color space;
  a step for determining a first output color signal value corresponding to a target color, which is determined for a grid point of the color conversion table to be created, by interpolation computation for the first color conversion table;
  a step for setting a neighboring region of the determined first output color signal value and determining a second output color signal value that is most approximate to the target color in the neighboring region, by using the color-space correspondence table; and
  a step for setting the determined second output color signal value as grid point data of the grid point of the color conversion table to be created.

In the second aspect of the present invention, there is provided an image processing apparatus for creating a color conversion table for converting an input color signal value into an output color signal value, the apparatus comprising:
  a first color conversion table for converting an input color signal value into an output color signal value;
  a color-space correspondence table for converting a color space which the output color signal value has into other predetermined color space;
  means for determining a first output color signal value corresponding to a target color, which is determined for a grid point of the color conversion table to be created, by interpolation computation for the first color conversion table;
  means for setting a neighboring region of the determined first output color signal value and determining a second output color signal value that is most approximate to the target color in the neighboring region, by using the color-space correspondence table; and
  means for setting the determined second output color signal value as grid point data of the grid point of the color conversion table to be created.

In the third aspect of the present invention, there is provided a method of estimating an output color signal by means of interpolation computation using a color conversion table for converting an input color signal value into an output color signal value, the method comprising the steps of:
  a step for providing a first color conversion table for converting an input color signal value into an output color signal value and a color-space correspondence table for converting a color space which the output color signal value has into other predetermined color space;
  a step for determining a first output color signal value corresponding to a target color, which is determined for a grid point of the color conversion table to be created, by the interpolation computation for the first color conversion table; and
  a step for setting a neighboring region of the determined first output color signal value and determining a second output color signal value that is most approximate to the target color in the neighboring region, by using the color-space correspondence table.

According to the above-described structure, the output color signal value corresponding to the target color set for the grid point of the color conversion table for creating are determined by interpolation computation in a first color conversion table. A neighboring region of the determined output signal value is set. An output color signal value which is the closest to the target color in the set neighboring region is determined by using the color-space correspondence table. The determined output signal value is set as grid point data of the grid point of the color conversion table for creating. Accordingly, there is no need for searching the output color signal values when determining the output color signal value corresponding to the target color at first.

As a result, the search time for creating the color conversion table is greatly reduced.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Hereinafter, embodiments of the present invention will be explained in detail with reference to the drawings.

Embodiment 1

Figure 1:
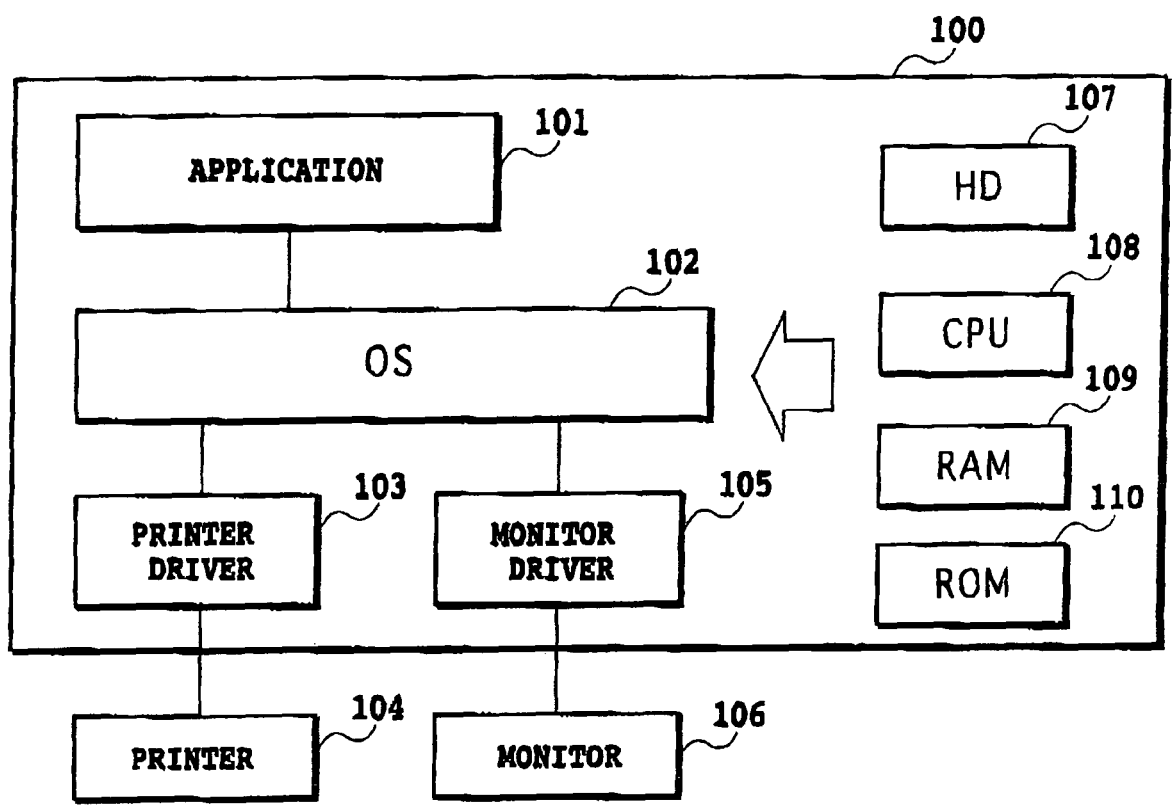
FIG. 1 is a block diagram showing a general configuration of an image output system according to an embodiment of the present invention.

FIG. 1 is a block diagram showing a general structure of an image output system according to an embodiment of the present invention.

In FIG. 1, a host computer 100 such as a personal computer has software programs, i.e., an operating system (OS) 102, an application software 101 such as a word processor, a spreadsheet software, and an Internet browser, which operates based on the operating system 102, a printer driver 103 which creates print data showing an output image by executing a drawing process according to various types of drawing commands (image-drawing command, text-drawing command, and graphics-drawing command or the like) which are issued from the application software 101 to the OS 102, and a monitor driver 104 creating image data displayed on a monitor 106.

The host computer 100 includes a CPU 108, a hard disk drive (HDD) 107, a RAM 109, and a ROM 110 as various types of hardware to operate the above software programs. Additionally, as an example of configuration shown in FIG. 1, the OS 102 may be Windows (a registered trademark), and the arbitrary application software 101 having a print function may be installed to the personal computer 100. Also, a printer 106 may be, for example, an inkjet printer, and the monitor 106 may be a CRT and an LCD.

The application software 101 of the host computer 100 creates output image data to be printed by using text data classified as text such as characters, graphics data classified as graphics, image data such as a photo image based on an image displayed on the monitor 106. When the output image is printed out, a print request is issued from the application software 101 to the OS 102, and a group of drawing commands, comprised of text drawing commands for text data, graphics drawing commands for graphics data, and image drawing commands for image data, is sent to the OS 102. When the OS 102 receives the print request, the OS 102 sends the group of drawing commands to the printer driver 103 associated with the printer for the printing. The printer driver 103 handles the print request input from the OS 102 and the group of drawing commands, creates print data printable for the printer 104, and transfers the print data to the printer 104.

In the case that the printer 104 is a raster printer, the printer driver 103 executes an image correction process to the group of drawing commands in succession, and rasterizes the image to generate the rasterized image in a page memory of RGB 24-bit. After all drawing commands have been rasterized, the printer driver 103 converts the RGB data stored in the page memory into a data format printable for the printer 104, for example, CMYK data, and transfers the CMYK data to the printer 104.

Figure 2:
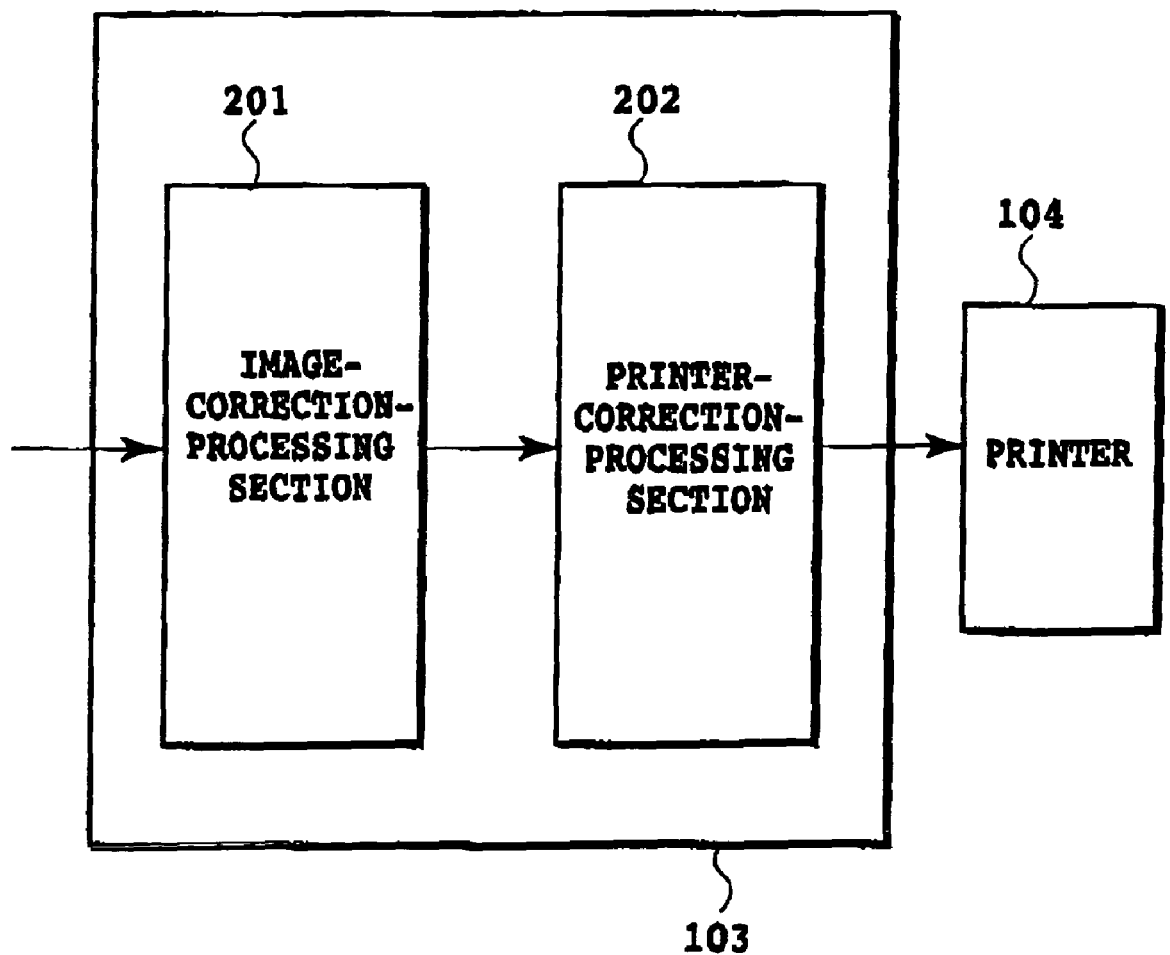
FIG. 2 is a diagram illustrating a process of a printer driver 103 shown in FIG. 1.

FIG. 2 is a diagram illustrating a process of the printer driver 103 shown in FIG. 1.

In FIG. 2, an image-correction-processing section 201 executes an image correction process to color information included in the group of drawing commands input from the OS 102. For example, color information of the device color space (for example, RGB) of the image input device is converted into a brightness/color difference signal, and the brightness signal is processed for exposure correction. After that, the corrected brightness/color difference signal is inversely converted into RGB color information of the device color space of the input device again.

Referring to the RGB color information of the device color space of the input device after the above-described image correction process, a printer-correction-processing section 202 rasterizes the image to generate a raster image in the page memory based on drawing commands. The raster image is processed for pre-color signal conversion (color conversion, which maintains the color reproducibility, from the device color space of the input device into the device color space of the output device), post-color signal conversion (color separation of RGB signals processed through the pre-color signal conversion into CMYK signals), and tone correction, for generating CMYK data which determines the color reproducibility of the printer 104 at each pixel.

Additionally, the process described above referring to FIG. 2 is explained as a process which the printer driver 103 executes, but the process may be performed by an application.

Figure 3:
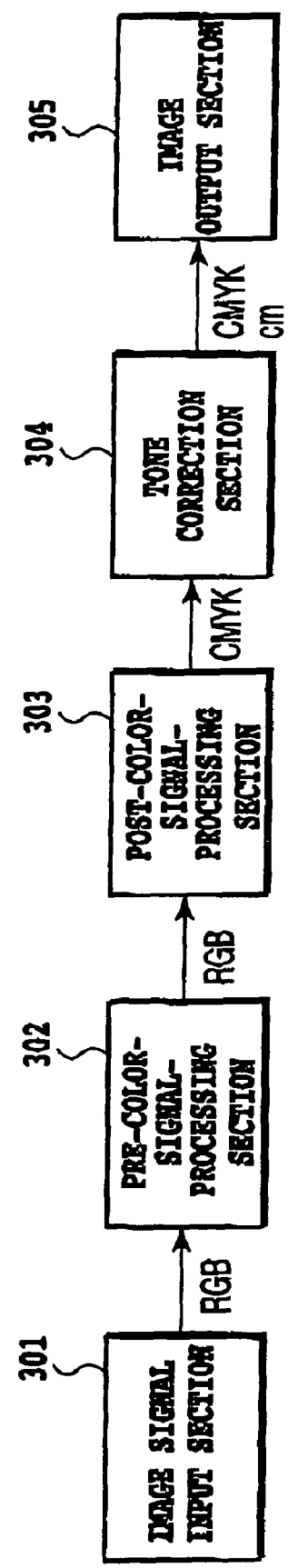
FIG. 3 is a diagram showing a process of a printer-correction-processing section 202 shown in FIG. 2 in detail.

FIG. 3 is a diagram showing a process of the printer-correction-processing section 202 shown in FIG. 2 in detail.

In FIG. 3, image data input by an image signal input section 301 is processed for input color matching process in a pre-color signal processing section 302. After that, the image data is processed for color separation process in consideration of properties of the ink jet printer in a post-color-signal-processing section 303, and for tone correction and halftoning process in a tone correction section 304. Thus, dot data of cyan (C), magenta (M), yellow (Y), black (K), light cyan (c), and light magenta (m), respectively, associated with ink of C, M, Y, K, c, and m used by the printer 104 is generated. An image output section 305 transfers the dot data to the printer 104 at is the timing of a printing operation of the printer 104. In the printer-correction-processing section 202, a LUT used in the pre-color signal conversion section is created in a table creating process described later in FIG. 5 and FIG. 6.

The present embodiment uses six ink colors for the printer 104, normal concentration ink C, M, Y, and K and light ink c and m which are in smaller concentrations than ink C and M, respectively. In the post-color signal process, the color separation is executed in consideration of granularity of printed dots and a total ink drop amount acceptable for a printing medium per unit time and unit area in the printer. The LUT used in the post-color processing section 303, in consideration of these conditions, executes color separation on the RGB data to output a proper combination of ink C, M, Y, K, c and m. Accordingly, operating the color process for the printer via the post-color processing section 303 enables handling the printer simply as an RGB device which processes RGB data, not depending on the configuration of the printer, for example, a color configuration of four colors of C, M, Y, and K or six colors of C, M, Y, K, c, and m. The RGB data of this case will be called post-RGB hereinafter. Concretely, RGB data output from the pre-color signal processing section 302 is the post-RGB.

The LUT used in the pre-color signal processing section 302 (hereinafter, also referred to as a pre-color processing table) is a three dimension LUT for color conversion of image data (of the input device independent RGB) of the device color space (color space of RGB) of the image input device into image data (of the output device independent RGB; the post-RGB) of the device color space of the output device. In the present embodiment, as to the color reproduction properties, pre-color processing tables associated with each of color reproducibility with emphasis on tone, color reproducibility with emphasis on chroma, color reproducibility with emphasis on coincidence of colorimetry, color reproducibility with emphasis on memory color, and color reproducibility with emphasis on memory color are prepared, and a pre-color processing table is selected according to, for example, an image to be printed. Additionally, to be compatible with other device color space of the input device, pre-process tables with the number of corresponding color space may be included.

Next, the creating process of the pre-color processing table will be explained.

The creating process, first, determines a target color corresponding to predetermined grid point constituting a pre-color processing table to be created. Next, the process determines post-RGB value which is most approximate to the target color, and sets the post-RGB value as grid point data that is corresponding color of the grid point. Here, the target color is specified as a value of color space Lab which is uniform color space. Specifically, in the LUT to be created, each color (a grid point) specified by an input RGB value includes color other than the color gamut of the printer. Thus, the color gamut compression is performed in response to the color reproducibility (nay one of color reproducibility with emphasis on tone, color reproducibility with emphasis on chroma, color reproducibility with emphasis on coincidence of colorimetry, color reproducibility with emphasis on memory color, and color reproducibility with emphasis on memory color), and the obtained color (a Lab value) is set as the target color. Grid point data of the grid point corresponding to the target color is determined for each grid point to create the LUT of the pre-color processing table.

In another method, the target color is a color (a Lab value) which is determined as a color (grid point) on some predetermined lines such as a line connecting white-red-black, in consideration of color reproduction properties, the color of which is each color (a grid point) specified by the input RGB value in the LUT to be created. After grid point data of the grid point corresponding to the target color is determined, by executing an interpolation operation using the thus obtained grid point data (post-RGB values) of predetermined grid points, grid point data of other grid points is determined to create the LUT of the pre-color processing table.

In detail, first, post-RGB data is changed with an appropriate sampling interval for obtaining predetermined combinations of post-RGB data. The obtained post-RGB data is processed by sections 303-305 shown in FIG. 3 for printing color patches. Then, these color patches are measured as Lab values by a colorimetric device, for example, Spectrolino by Gretag Co for obtaining a group of Lab values corresponding to color patches. A color-space correspondence table, which shows correspondence from post-RGB values to Lab values, is determined based on the result of the colorimetry. In other words, grid points of the table are specified by RGB values, and the grid point data is specified by the Lab values. The reason to print the patches and use the colorimetry result is the difficulty in predicting the coloration properties because complex and wide-ranging factors are related to coloration such as a variation in coloration caused by the color mixture of ink and by a variation in permeation of ink to the printing medium for an inkjet printer. An interpolation operation using the above determined color-space correspondence table enables to determine Lab values of arbitrary post-RGB values.

Next, the target color (the Lab value) corresponding to grid point constituting the pre-color processing table to be created is compared with the Lab value associated with the post-RGB value by the color-space correspondence table. Then, a point which can be approximated as a point at which the color difference is minimum is searched based the comparison. An RGB value with which the color difference is minimum is set as a corresponding color of the grid point constituting the pre-color processing table, i.e., as the grid point data. By executing the above-described process to predetermined grid points constituting the pre-color processing table likewise, grid point data of grid points on a plurality of predetermined lines of the pre-color processing table can be determined.

Figure 4:
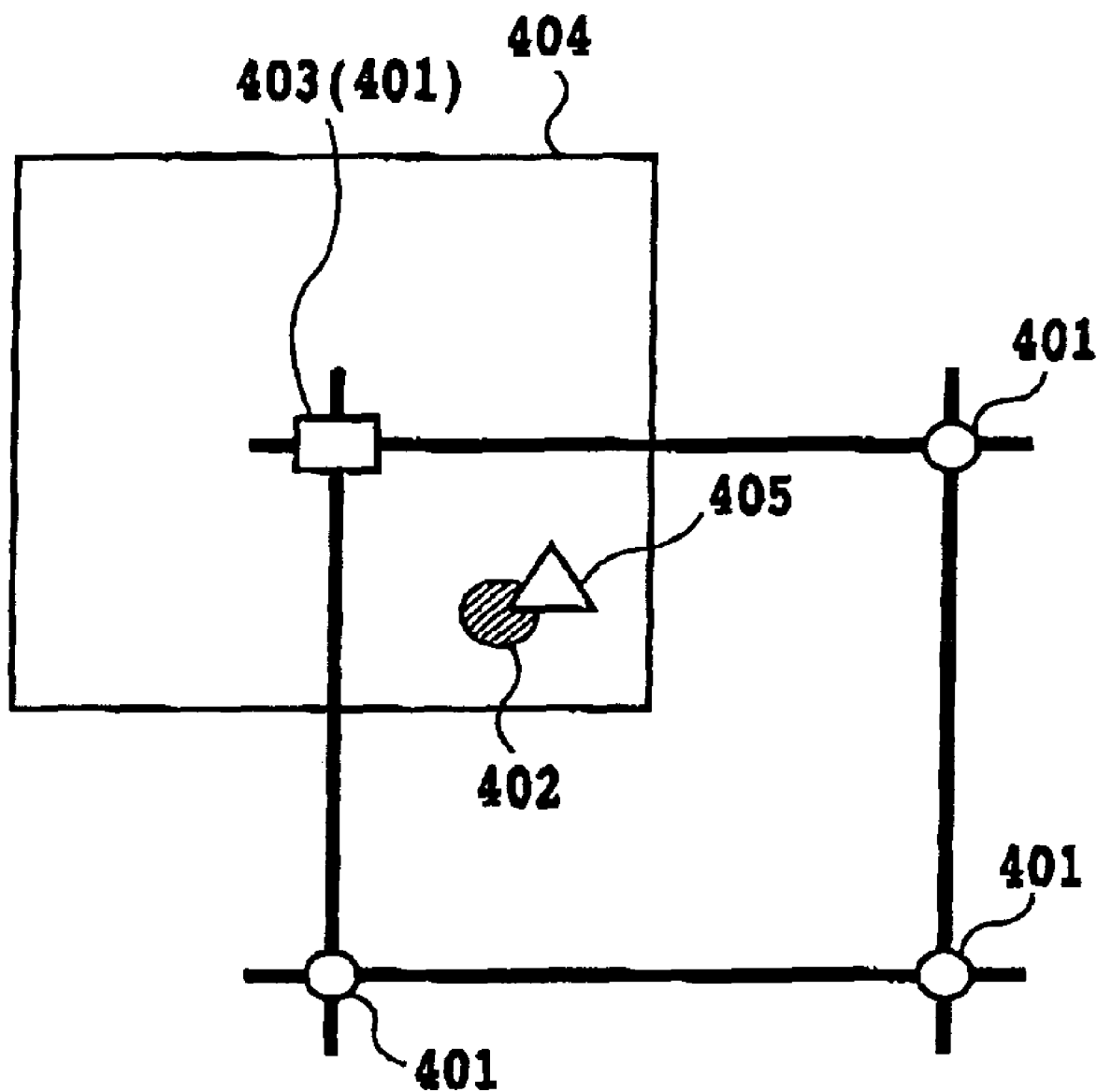
FIG. 4 is a diagram showing a method for creating a table described in a known example for a comparison about creating a table.

FIG. 4 is a diagram illustrating a method for creating a table described in Japanese Patent No. 3371964 for a comparison about creating a table. To simplify explanation, grid points of the table are explained as a two dimension array, although, in reality, three dimension.

In FIG. 4, the reference numeral 401 denotes a grid point constituting the color-space correspondence table which specifies correspondence from post-RGBs to Lab values. On the other hand, the reference numeral 402 denotes a Lab value which is a target color of the grid point constituting the pre-color processing table. In other words, FIG. 4 shows both the grid point of the color-space correspondence table and the position of color (a Lab value) in Lab color space simultaneously.

In the method of creating a table disclosed in Japanese Patent No. 3371964, first, among grid points constituting the color-space correspondence table, a grid point at which a color difference between a Lab value which is the grid point data and the target color is minimum is searched (the first search). The thus obtained color-difference-minimum-grid point is a grid point 403.

Next, a neighboring region 404 of the post-RGB value in which a search is executed is set. Then, among post-RGB values of the neighboring region, an approximate point at which the color difference between a corresponding Lab value and the target color is minimum is searched (the second search). The searched point (the post-RGB value) is set as grid point data of the object grid point. The thus obtained corresponding point is shown by the reference numeral 405.

When a post-RGB is defined in 0 to 255 and the number of grid points constituting the color-space correspondence table from post-RGBs to Lab values is 9×9×9, the number of grid points to be searched is 9×9×9=729 in the first search. In the second search, because the neighboring region to be searched needs to contain intermediate values of mid-grid points, a region in which the distance from the grid point is 16 needs to be searched when the distance between adjacent grid points is 32. Thus, a neighboring region to be searched is a range of at least 33×33×33 in the second search. For another example, when the number of grid points constituting the color-space correspondence table is 17×17×17, the number of grid points to be searched is 17×17×17=4913 in the first search. In this case, the neighboring region to be searched is a range at least 17×17×17 in the second search.

Figure 5:
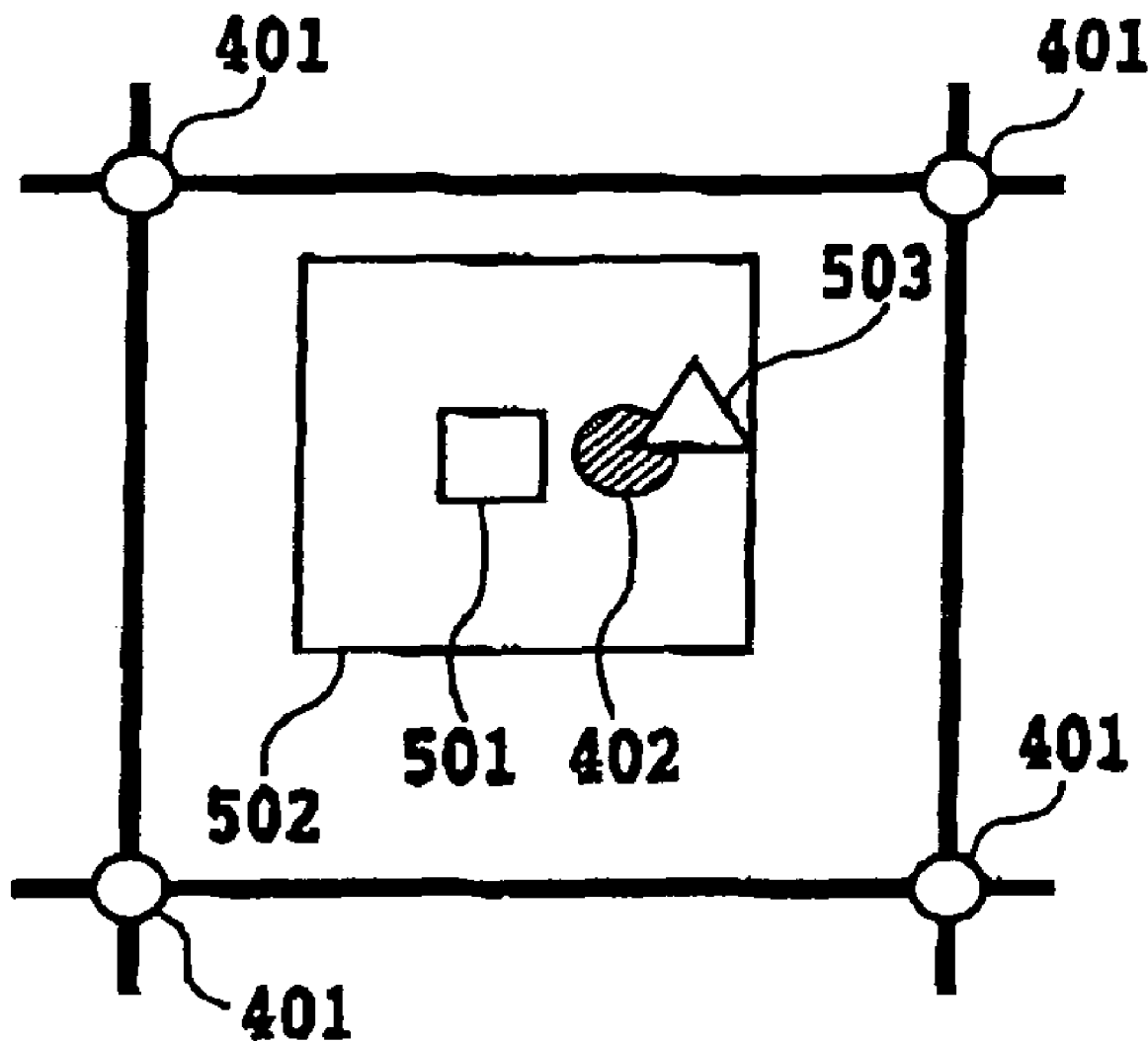
FIG. 5 is a diagram showing a creating process of a pre-color-processing table according to an embodiment of the present invention.

FIG. 5 is a diagram illustrating a creating process of the pre-color processing table according to the present embodiment.

In the present embodiment, a plurality of pre-color processing tables are created for respective color reproduction properties, as described previously. In the present embodiment, first, the first pre-color processing table is prepared beforehand. It should be noted that the first pre-color processing table may be created by using a known method such as the method of Japanese Patent No. 3371964. Then, the method of creating a table according to an embodiment of the present invention is applied to creation of the second and after pre-color processing tables.

In FIG. 5, the reference numeral 401 denotes a grid point constituting the color-space correspondence table which specifies the relationship from post-RGBs to Lab values. Also, the reference numeral 402 denotes a Lab value which is a target color of the grid point constituting the second pre-color processing table to be created. As FIG. 4, FIG. 5 shows both the grid point of the color-space correspondence table and the position of color (a Lab value) in Lab color space simultaneously.

In the present embodiment, for a predetermined grid point constituting the second pre-color processing table, a post-RGB value 501 corresponding to the target color of the pre-determined grid point is determined by interpolation computation using the first pre-color processing table created beforehand as described. More specifically, in response to a position of the target color (the Lab value) of the above-described predetermined grid point which is an object grid point of the process in the first pre-color processing table, interpolation operation using each grid point data (post-RGB values) of a plurality of grid points of the neighborhood in the position is executed, and thus the post-RGB value 501 associated with the object grid point is determined.

Next, a neighboring region 502 of the obtained post-RGB value 501 is set, and by using the color-space correspondence table, a post-RGB value 503 which most approximates the target color among all post-RGB values included in the neighboring region 502 is determined as grid point data of the object grid point.

The above-described process is executed for all predetermined grid points to determine grid point data. Grid point data of other grid points can be determined by executing interpolation operation using predetermined grid point data, and thus the second pre-color processing table can be created.

In addition, the third and after pre-color processing tables can also be determined just as the above-described method.

As described above, the method of the present embodiment to create the second and after pre-color processing tables does not need to execute the first search searching a grid point at which a color difference with the target value is minimum among grid points constituting the color-space correspondence table from post-RGBs to Lab values, compared with the method disclosed in Japanese Patent No. 3371964. Accordingly, when the number of grid points constituting the color-space correspondence table is 9×9×9, 9×9×9=729 searches can be omitted for each target value, and when the number of grid points is 17×17×17, 17×17×17=4913 searches can be omitted, thus the search time can be reduced greatly.

Moreover, the first pre-color processing table is preferably a table which realizes color reproducibility with emphasis on coincidence of colorimetry. More specifically, this table has the color reproduction property that set the target value of the grid point when the table is created to be coincident with the colorimetry value of the patch printed with the post-RGB value of the grid point data of that grid point. This first pre-color processing table having the color reproducibility with emphasis on coincidence of colorimetry is previously created and used when creating the second table. Then, the post-RGB value which is most approximate to the grid point data of the grid point corresponding to the target value can be determined directly by the interpolation process for the first table. However, the precision of the obtained post-RGB value is inferior compared with a post-RGB value determined by using a LUT from device dependent color space of the output equipment to the uniform-color color space because the obtained post-RGB value contains an interpolation error caused from the interpolation process. However, the Lab value of post-RGB value 501 obtained by interpolation computation of grid points constituting the second or after pre-color processing tables is relatively close to the Lab value of the target color corresponding to the object grid point, so that the possibility that the signal value 503 at which the color difference is minimum is very near to the obtained post-RGB value 501 is high. Thus, the neighboring range to be searched can be made smaller in the second search by using the table which realizes the color reproducibility with emphasis on coincidence of colorimetry for the first pre-color processing table. In the method disclosed in Japanese Patent No. 3371964, a neighboring region is 33×33×33 when the number of grid points constituting the color-space correspondence table is 9×9×9, and, for another example, a neighboring region is 17×17×17 when the number of grid points is 17×17×17, however, the method of the present embodiment can reduce these ranges greatly.

Figure 6:
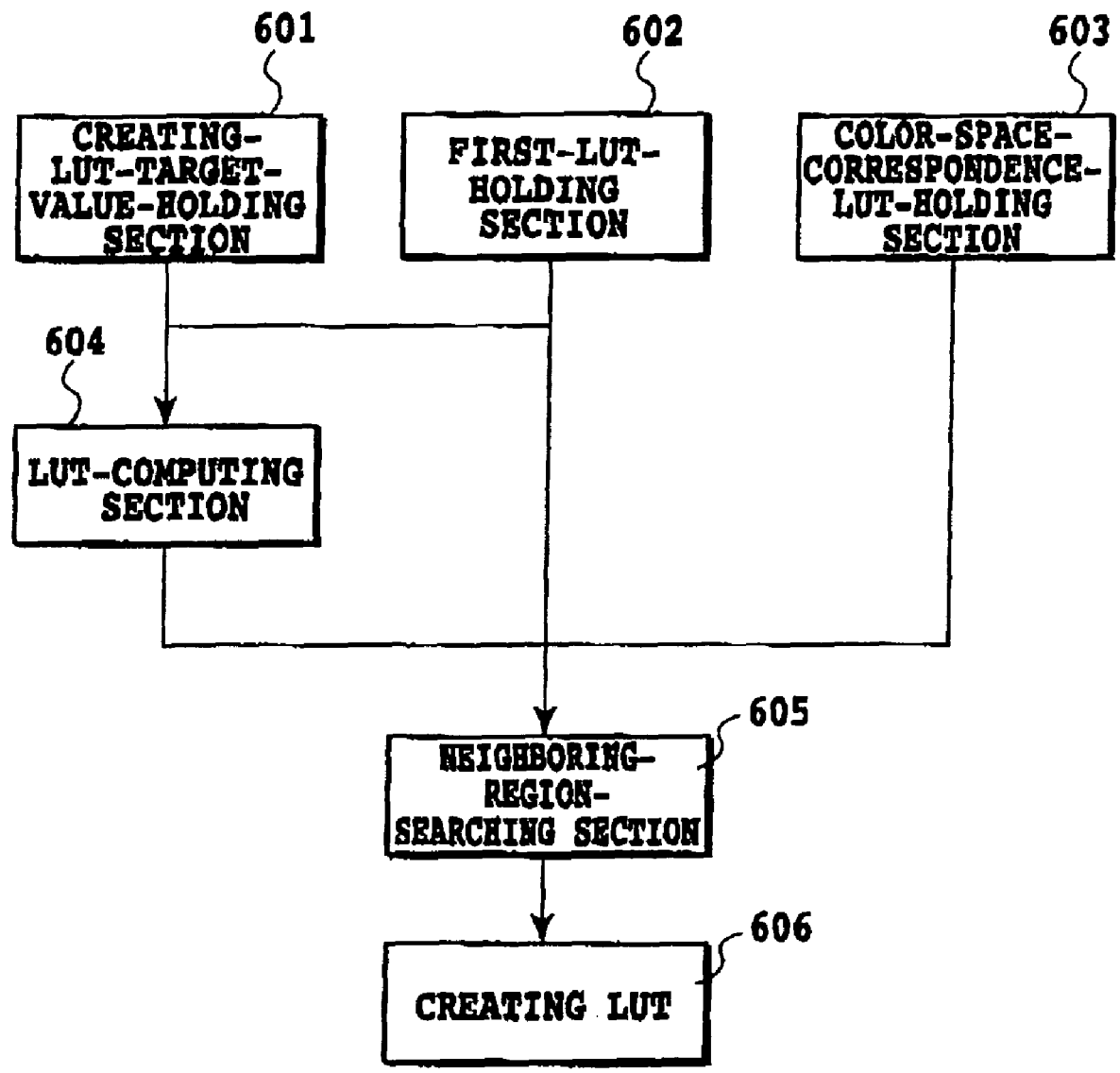
FIG. 6 is a block diagram showing a function of an image processing apparatus creating the pre-color-processing table according to an embodiment of the present invention.

FIG. 6 is a block diagram showing a function of the image processing apparatus creating the pre-color processing table according to the present embodiment.

The image processing apparatus of the present embodiment has a first-LUT-holding section 602 holding the first LUT created beforehand which is the first pre-color processing table linking the device color space of the input device with the device color space of the output device, a color-space-corresponding-LUT-holding section 603 holding a color-space correspondence table linking the device color space of the output device with the uniform-color color space, and a creating-LUT-target-value-holding section 601 holding the target colors (values) of a grid points constituting the pre-color processing table to be created. Then, a LUT-computing section 604 executes interpolation computation on color signal values of the device color space of the output device corresponding to the target color by using the first LUT. Further, a neighboring-region-searching section 605 determines a signal value of device color space of the output device which is most approximate to the target color among all color signal values in a neighboring region of the color signal value of the device color space of the output device acquired in interpolation by using the color-space-corresponding LUT, to create a pre-color-processing table 606.

Embodiment 2

In the first embodiment described above, the method for creating a pre-color conversion table for color conversion from the device color space of the input device into the device color space of the output device (post-RGB) is described. However, it is obvious from the explanation of the above-described embodiment that a method for creating a color signal conversion table converting directly from the device color space of the input device into the device color space of the output device (CYMK) can be used instead of a processing system executing two types of color conversion, i.e., pre-color conversion and post-color conversion.

Embodiment 3

In the first and second embodiments described above, the method for creating a color conversion table from the device color space of the input device to the device color space of the output device (post-RGB or CMYK) is described. However, the embodiments can be applied to a method for creating a color conversion table from device independent color space (XYZ or Lab) to the device color space of the output device (post-RGB or CMYK) which is used in color conversion using an ICC profile.

Embodiment 4

In the first to third embodiments described above, the method for creating a color conversion table is described. However, by using the method to estimate post-RGB values described in the first embodiment when the pre-color-signal-processing section 302 executes interpolation operation in the pre-color processing table converting the pre-color signal into the post-color signal, the precision of the conversion of post-color signal values obtained in the pre-color-signal-processing section 302 can be enhanced. In other words, the above-described pre-color processing table is used as the first table, and post-RGB values can be estimated as an interpolation result using the first table and the color-space-compatible table prepared beforehand.

Embodiment 5

In the first to fourth embodiments described above, a series of processes is executed on the host computer 100. However, the series of the above-described processes can be executed on the printer 104 by equipping the printer 104 with a function equal to the host computer 100.

For example, when the function equal to the host computer 100 is provided in the printer, image data can be read from an image input device such as a digital camera by a reading means such as a card reader provided in the printer via a memory card, or can be read from a memory card held in a digital camera or an embedded memory by connecting the digital camera with the printer by a wired cable, an infrared communication means, or a radio communication means.

Embodiment 6

The present invention can also be realized by supplying the process program to another computer as software. In that case, the process program realizing the present invention can be supplied by using a printing medium or a computer-readable medium, for example, a floppy (a registered trademark) disk, a hard disk, an optical disk, a magneto-optical disk, a CD-ROM, a CD-R, a magnetic tape, a nonvolatile memory card, and a ROM.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application No. 2004-229357 filed Aug. 5, 2004, which is hereby incorporated by reference herein.

What is claimed is:

1. A method of creating a second color conversion table for converting an input color signal value into an output color signal value, said method comprising:
    using a processor to perform the steps of:
    creating a first color conversion table for converting an input color signal value into an output color signal value by using a first target color corresponding to color reproducibility with emphasis on coincidence of colorimetry, and a color-space correspondence table for converting from a color space of the output color signal value into another predetermined color space;
    determining a first output color signal value corresponding to a second target color, which is determined for a grid point of the second color conversion table to be created, by an interpolation computation of the first color conversion table;
    setting a neighboring region of the determined first output color signal value and determining a second output color signal value that is most approximate to the second target color in the neighboring region, by using the color-space correspondence table; and
    setting the determined second output color signal value as grid point data of the grid point of the second color conversion table to be created,
    wherein the second color conversion table is any one of a table associated with color reproducibility with emphasis on tone, a table associated with color reproducibility with emphasis on chroma, or a table associated with color reproducibility with emphasis on memory color, and
    wherein said second target color is a color of reproducibility with emphasis on tone, a color of reproducibility with emphasis on chroma, or a color of reproducibility with emphasis on memory color.

2. An image processing apparatus for creating a second color conversion table for converting an input color signal value into an output color signal value, said apparatus comprising:
    means for creating a first color conversion table for converting an input color signal value into an output color signal value by using a first target color corresponding to color reproducibility with emphasis on coincidence of colorimetry;
    means for creating a color-space correspondence table for converting from a color space of the output color signal value into another predetermined color space;
    means for determining a first output color signal value corresponding to a second target color, which is determined for a grid point of the second color conversion table to be created, by an interpolation computation of the first color conversion table;
    means for setting a neighboring region of the determined first output color signal value and determining a second output color signal value that is most approximate to the second target color in the neighboring region, by using the color-space correspondence table; and
    means for setting the determined second output color signal value as grid point data of the grid point of the second color conversion table to be created,
    wherein the second color conversion table is any one of a table associated with color reproducibility with emphasis on tone, a table associated with color reproducibility with emphasis on chroma, or a table associated with color reproducibility with emphasis on memory color, and
    wherein said second target color is a color of reproducibility with emphasis on tone, a color of reproducibility with emphasis on chroma, or a color of reproducibility with emphasis on memory color.

3. A method of estimating an output color signal by means of interpolation computation using a second color conversion table for converting an input color signal value into an output color signal value, said method comprising:
    using a processor to perform the steps of:
    creating a first color conversion table for converting an input color signal value into an output color signal value by using a first target color corresponding to color reproducibility with emphasis on coincidence of colorimetry, and a color-space correspondence table for converting from a color space of the output color signal value into another predetermined color space;

determining a first output color signal value corresponding to a second target color, which is determined for a grid point of the second color conversion table to be created, by an interpolation computation for the first color conversion table; and setting a neighboring region of the determined first output color signal value and determining a second output color signal value that is most approximate to the second target color in the neighboring region, by using the color-space correspondence table, wherein the second color conversion table is any one of a table associated with color reproducibility with emphasis on tone, a table associated with color reproducibility with emphasis on chroma, or a table associated with color reproducibility with emphasis on memory color, and wherein said second target color is a color of reproducibility with emphasis on tone, a color of reproducibility with emphasis on chroma, or a color of reproducibility with emphasis on memory color.

4. A program stored on a non-transitory computer-readable medium, the program for executing processing of creating a second color conversion table for converting an input color signal value into an output color signal value, and for causing an image processing apparatus to process code of the program, wherein the program comprises code for:

creating a first color conversion table for converting an input color signal value into an output color signal value by using a first target color corresponding to color reproducibility with emphasis on coincidence of colorimetry, and a color-space correspondence table for converting from a color space of the output color signal value into another predetermined color space;

determining a first output color signal value corresponding to a second target color, which is determined for a grid point of the second color conversion table to be created, by an interpolation computation of the first color conversion table;

setting a neighboring region of the determined first output color signal value and determining a second output color signal value that is most approximate to the second target color in the neighboring region, by using the color-space correspondence table; and setting the determined second output color signal value as grid point data of the grid point of the second color conversion table to be created, wherein the second color conversion table is any one of a table associated with color reproducibility with emphasis on tone, a table associated with color reproducibility with emphasis on chroma, or a table associated with color reproducibility with emphasis on memory color, and wherein said second target color is a color of reproducibility with emphasis on tone, a color of reproducibility with emphasis on chroma, or a color of reproducibility with emphasis on memory color.

5. A program stored on a non-transitory computer-readable medium, the program for executing processing of creating a second color conversion table for converting an image signal of a predetermined color space into an image signal dependent on an output device, said program comprising code for:

creating a first color conversion table for converting an image signal of the predetermined color space into an image signal dependent on the output device by using a first target color corresponding to color reproducibility with emphasis on coincidence of colorimetry;

determining an image signal depending on the output device, said image signal being approximate to a second target value corresponding to a grid point of the second color conversion table to be created, by using the first color conversion table; and setting the determined image signal dependent on the output device as grid point data of the second color conversion table to be created, wherein the second color conversion table is any one of a table associated with color reproducibility with emphasis on tone, a table associated with color reproducibility with emphasis on chroma, or a table associated with color reproducibility with emphasis on memory color, and wherein said second target color is a color of reproducibility with emphasis on tone, a color of reproducibility with emphasis on chroma, or a color of reproducibility with emphasis on memory color.

6. A program as claimed in claim 5, wherein the image signal depending on the output device and being approximate to a target value is determined by an interpolation process image signals including said image signal.

7. A method of creating a second color conversion table for converting an input color signal value into an output color signal value, said method comprising:

using a processor to perform the steps of:

creating a first color conversion table for converting an input color signal value into an output color signal value by using a first target color, and a color space correspondence table for converting from a color space of the output color signal value into another predetermined color space;

determining a first output color signal value corresponding to a second target color, which is determined for a grid point of the second color conversion table to be created, by an interpolation computation of the first color conversion table;

setting a neighboring region of the determined first output color signal value and determining a second output color signal value that is most approximate to the second target color in the neighboring region, by using the color space correspondence table; and setting the determined second output color signal value as grid point data of the grid point of the second color conversion table to be created, wherein the first color conversion table is any one of a table associated with color reproducibility with emphasis on coincidence of colorimetry, a table associated with color reproducibility with emphasis on tone, a table associated with color reproducibility with emphasis on chroma, or a table associated with color reproducibility with emphasis on memory color, and the second color conversion table is a table other than the first color conversion table and is any one of a table associated with color reproducibility with emphasis on tone, a table associated with color reproducibility with emphasis on chroma, or a table associated with color reproducibility with emphasis on memory color, and wherein said first target color is a color of reproducibility with emphasis on coincidence of colorimetry, a color of reproducibility with emphasis on tone, a color of reproducibility with emphasis on chroma, or a color of reproducibility with emphasis on memory color, and said second target color is a color other than the first target color and is any one of a color of reproducibility with emphasis on coincidence of colorimetry, a color of reproducibility with emphasis on tone, a color of reproducibility with emphasis on chroma, or a color of reproducibility with emphasis on memory color.

* * * * *